(12) United States Patent
Schauer

(10) Patent No.: US 9,686,977 B2
(45) Date of Patent: Jun. 27, 2017

(54) WATERFOWL DECOY DEVICE

(71) Applicant: Matthew N. Schauer, Clark, SD (US)

(72) Inventor: Matthew N. Schauer, Clark, SD (US)

( * ) Notice: Subject to any disclaimer, the term of this patent is extended or adjusted under 35 U.S.C. 154(b) by 140 days.

(21) Appl. No.: 14/608,609

(22) Filed: Jan. 29, 2015

(65) Prior Publication Data

US 2016/0219867 A1 Aug. 4, 2016

(51) Int. Cl.
*A01M 31/06* (2006.01)
*G08C 17/02* (2006.01)

(52) U.S. Cl.
CPC ............ *A01M 31/06* (2013.01); *G08C 17/02* (2013.01)

(58) Field of Classification Search
CPC ................................................. A01M 31/06
USPC ...... 43/3, 2; 472/7, 8, 10; 446/30, 228, 229; 40/411, 417
See application file for complete search history.

(56) References Cited

U.S. PATENT DOCUMENTS

| | | | |
|---|---|---|---|
| 2,468,893 A | 3/1949 | Orange | |
| 2,791,427 A * | 5/1957 | Johnson | A63F 9/0247 273/351 |
| 2,874,496 A * | 2/1959 | Rakes | A47G 33/126 248/523 |
| 3,383,110 A * | 5/1968 | Brown | A63F 9/0247 273/333 |
| 3,598,403 A | 8/1971 | Bartlett | |
| 4,043,406 A * | 8/1977 | Wolf | A63F 9/14 273/138.1 |
| 6,216,382 B1 | 4/2001 | Lindaman | |
| 7,846,032 B2 | 12/2010 | Zamperla et al. | |
| 7,854,660 B2 | 12/2010 | Crawford | |
| 8,162,768 B2 | 4/2012 | Nemeth et al. | |
| 8,303,426 B2 | 11/2012 | Crawford | |
| 8,317,632 B2 | 11/2012 | Nemeth et al. | |
| 8,388,458 B2 | 3/2013 | Buhler | |
| 2009/0229164 A1* | 9/2009 | Bradley | A01M 31/06 43/2 |
| 2009/0260274 A1* | 10/2009 | Rogers | A01M 31/06 43/2 |
| 2013/0014422 A1* | 1/2013 | Bullerdick | A01M 31/06 43/3 |
| 2013/0104443 A1* | 5/2013 | Cramer | A01M 31/06 43/2 |
| 2013/0199076 A1* | 8/2013 | Dean | A01M 31/06 43/3 |
| 2013/0247441 A1 | 9/2013 | Bellamy et al. | |
| 2014/0245652 A1* | 9/2014 | Franklin | A01M 31/06 43/2 |
| 2015/0164063 A1* | 6/2015 | Rutledge | A01M 31/06 43/2 |

(Continued)

*Primary Examiner* — Peter M Poon
*Assistant Examiner* — Magdalena Topolski

(57) ABSTRACT

A waterfowl decoy device provides remote control to raise and lower decoys attached to a moving hub such that the decoys simulate flight. The device includes a hub and a support arm coupled to the hub. The support arm is movable relative to the hub such that a distal end of the support arm relative to the hub is selectively raised and lowered relative to a position of the hub. A decoy is coupled to the distal end of the support arm wherein raising and lowering of the distal end of the support arm imparts elevation and descent motion to the decoy. The hub is further structured to rotate the support arm imparting motion to the decoy simulating flight.

3 Claims, 4 Drawing Sheets

(56) References Cited

U.S. PATENT DOCUMENTS

2015/0181861 A1* 7/2015 Butz .................... A01M 31/06
43/2

* cited by examiner

WATERFOWL DECOY DEVICE

BACKGROUND OF THE DISCLOSURE

Field of the Disclosure

The disclosure relates to decoy devices and more particularly pertains to a new decoy device for providing remote control to raise and lower decoys attached to a moving hub such that the decoys simulate flight.

SUMMARY OF THE DISCLOSURE

An embodiment of the disclosure meets the needs presented above by generally comprising a hub and a support arm coupled to the hub. The support arm is movable relative to the hub such that a distal end of the support arm relative to the hub is selectively raised and lowered relative to a position of the hub. A decoy is coupled to the distal end of the support arm wherein raising and lowering of the distal end of the support arm imparts elevation and descent motion to the decoy. The hub is further structured to rotate the support arm imparting motion to the decoy simulating flight.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
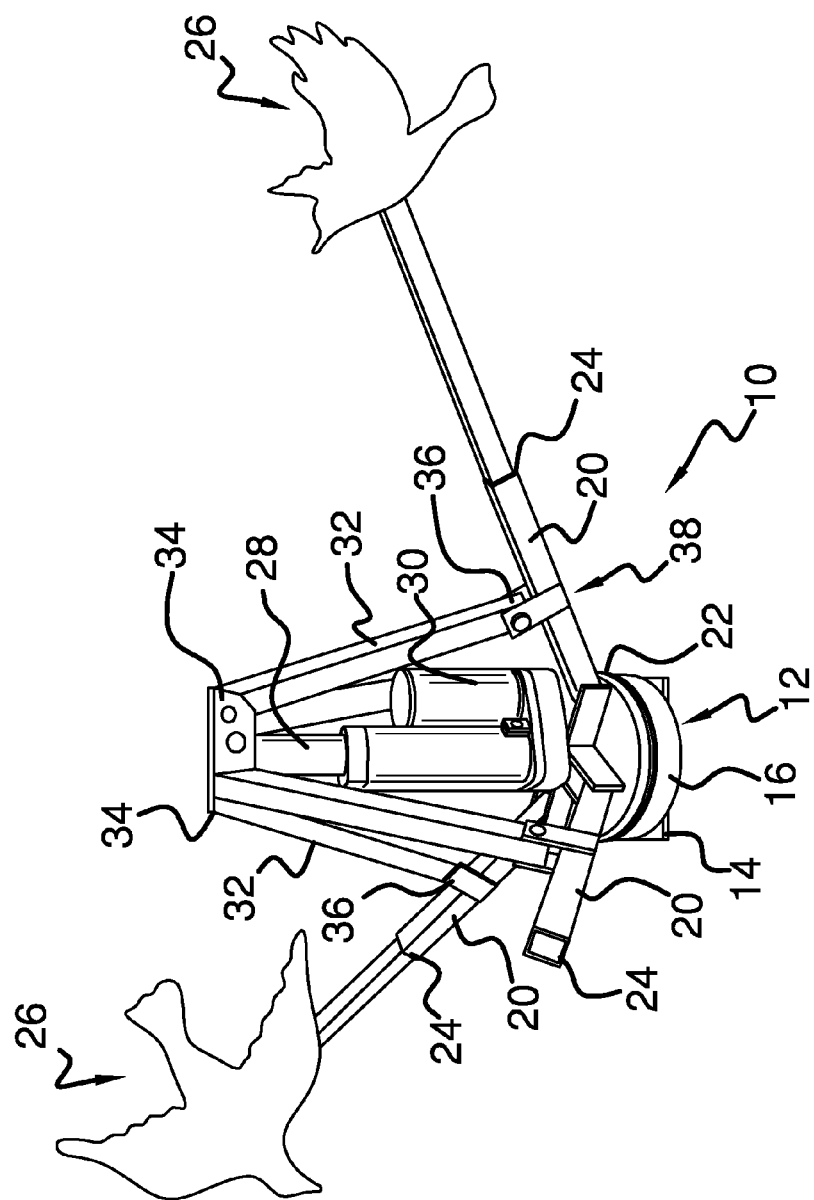
FIG. 1 is a top front side perspective view of a waterfowl decoy device according to an embodiment of the disclosure.
Figure 2:
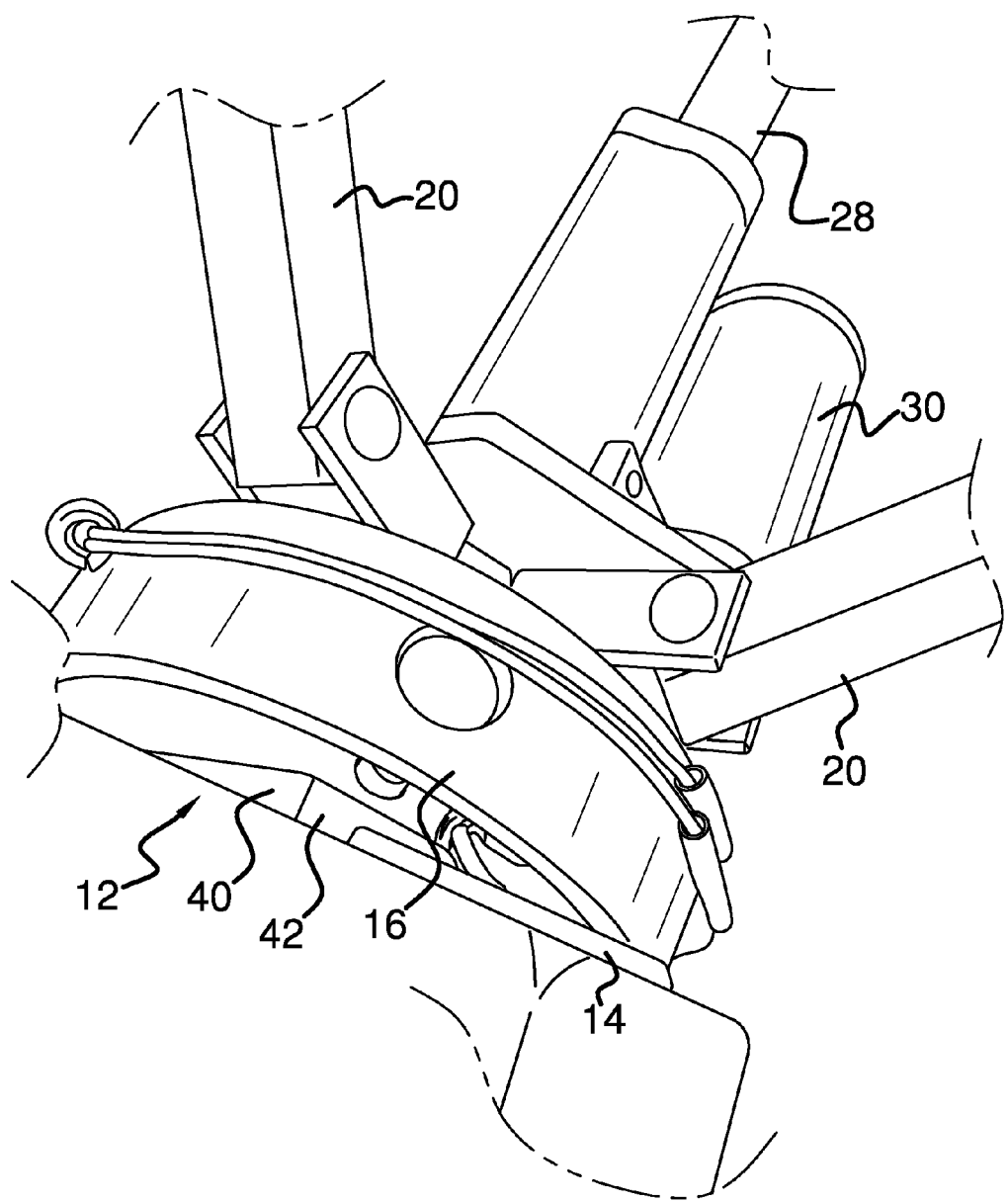
FIG. 2 is a partial bottom front side perspective view of an embodiment of the disclosure.
Figure 3:
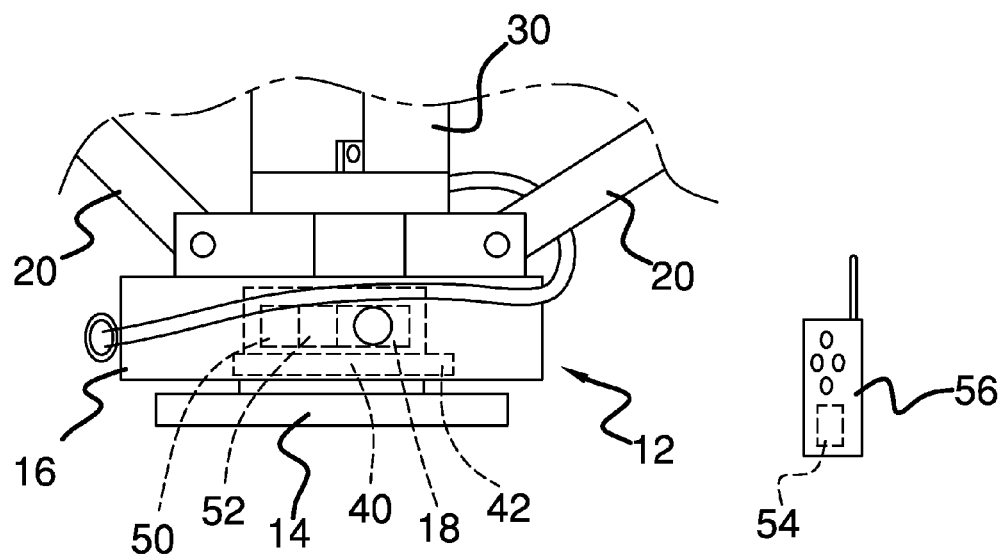
FIG. 3 is a partial side view of an embodiment of the disclosure.
Figure 4:
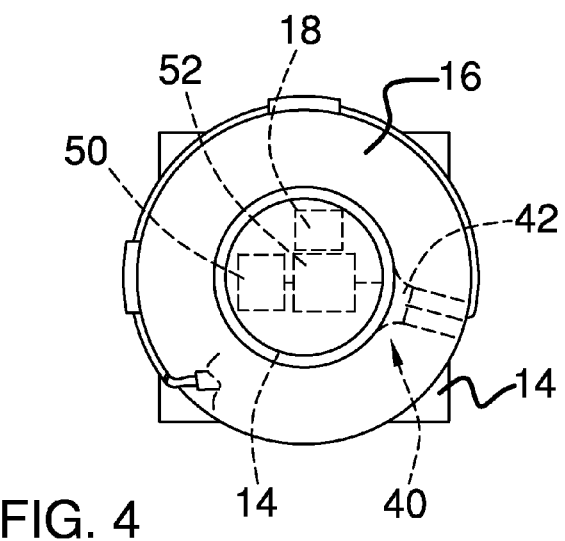
FIG. 4 is a partial top view of an embodiment of the disclosure.
Figure 5:
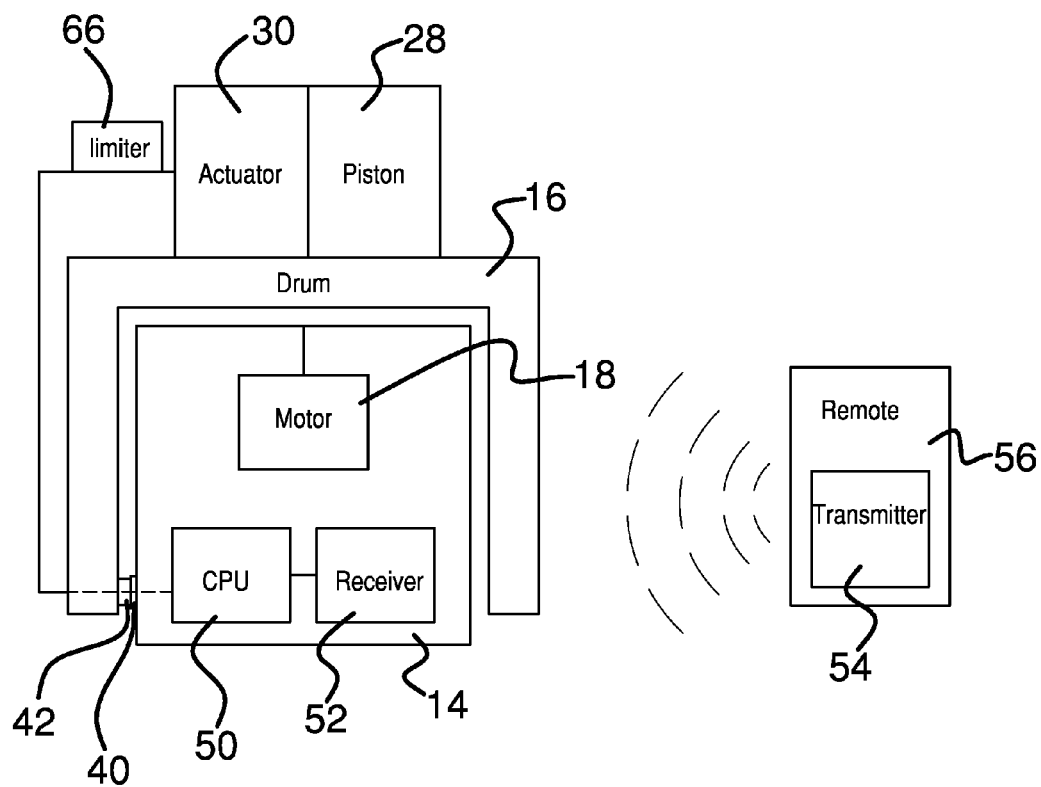
FIG. 5 is a schematic view of an embodiment of the disclosure.

With reference now to the drawings, and in particular to FIGS. 1 through 5 thereof, a new decoy device embodying the principles and concepts of an embodiment of the disclosure and generally designated by the reference numeral 10 will be described.

As best illustrated in FIGS. 1 through 5, the waterfowl decoy device 10 generally comprises a hub 12 including a base 14 and a drum 16 rotationally coupled to the base 14.

A motor 18 is operationally coupled to the base 14 and the drum 16 for rotating the drum 16 relative to the base 14. The drum 16 may be rotated using conventional gearing, direct connection to an axle, or the like. Each of a plurality of support arms 20 is coupled to the hub 12. Each support arm 20 has a respective first end 22 pivotally coupled to the hub 12. Each support arm 20 extends radially from the hub 12 wherein each support arm 20 includes a distal end 24 relative to the hub 12. Each support arm 20 is movable relative to the hub 12 such that the distal end 24 of each support arm 20 is selectively raised and lowered relative to a position of the hub 12. There may be exactly four support arms 20 evenly arranged and extending radially outward from the drum 12. Each of a plurality of decoys 26 is coupled to the distal end 24 of an associated one of the support arms 20 wherein raising and lowering of the distal end 24 of each support arm 20 imparts elevation and descent motion to each decoy 26.

To achieve the elevation and descent motion of the decoys 26, a piston 28 is coupled to the drum 16. The piston 28 is extendable upwardly from the drum 28. An actuator 30 is operationally coupled to the piston 28 in a conventional manner wherein the actuator 30 extends and retracts the piston 28 relative to the drum 16. Each of a plurality of connection arms 32 has a respective upper end 34 coupled to the piston 28 and a respective lower end 36 coupled to an associated one of the support arms 20 wherein extension of the piston 28 elevates each distal end 24 of each support arm 20. The lower end 36 of each connection arm 32 is pivotally coupled to the associated one of the support arms 20 at a point 38 of the support arm 20 between the first end 22 and the distal end 24 of the support arm 20. The point 38 may be a midpoint between the first end 22 and the distal end 24. All the support arms 20 may have an equal length and the point 38 may be equidistant from the first end 22 to promote balance of the drum 16 on the base 14.

A ring 40 is coupled to the base 14 such that the drum 16 extends around the ring 40. The ring 40 is electrically conductive and configured for electrically coupling to a power source such as a battery which may be coupled to the hub 12, or a connection cord extending from the base 14 and coupleable to an electrical source. A brush 42 is coupled to the hub 12 on the drum 16. The brush 42 is electrically coupled to the actuator 30. The brush 42 abuts the ring 40 as the drum 16 rotates relative to the base 14 wherein the actuator 30 maintains electrical coupling to the ring 40 as the drum 16 rotates relative to the base 14. Thus, a conventional electric ram may be used and coupled to the drum 16 to provide the piston 28 and actuator 30.

Each support arm 20 has a respective opening 46 extending into the distal end 24 of each support arm 20. Each decoy 26 may comprise a post 48 extending from a main body section 50 wherein each decoy 26 is couplable to the associated one of the support arms 20 by insertion of the post 48 into the distal end 24 of the associated one of the support arms 20. The support arms 20 may be tubular and have a polygonal transverse cross-sectional shape complementary to an outer shape of each post 48.

A processor 50 is coupled to the hub 12. The processor 50 is operationally coupled to the actuator 30 wherein the processor 50 controls raising and lowering of the distal end 24 of each support arm 20. The processor 50 is also operationally coupled to the motor 18 wherein the processor 50 controls activation of the motor 18 to rotate the drum 16 relative to the base 14. A receiver 52 is coupled to the hub 12. The receiver 52 is operationally coupled to the processor 50. A transmitter 54 is coupled to a remote control 56 such that operational signals from the remote control 56 are transmittable to the receiver 52 wherein each support arm 20 is movable by operation of the remote control 56 and the drum 16 is rotated relative to the base 14 by operation of the remote control 56. A limiter 66 is operationally coupled to the piston 28 and the processor 50 wherein the processor 50 deactivates the motor 18 when the piston is fully retracted and the support arms 20 are fully lowered. Thus, the decoys 26 will stop movement when fully lowered simulating landing of a bird.

In use, the hub 12 is positioned in a desired location. The decoys 26 are moved by rotation of the drum 16 and elevation and descent of the support arms 20 controlled using the remote control 56.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A waterfowl decoy device comprising:
   a hub, said hub comprising a base and a drum rotationally coupled to said base;
   a plurality of support arms coupled to said hub, each said support arm having a respective first end pivotally coupled to said hub, each said support arm extending radially from said hub wherein each said support arm has a distal end relative to said hub, each said support arm being movable relative to said hub such that said distal end of each said support arm relative to said hub is selectively raised and lowered relative to a position of said hub;
   a plurality of decoys, each said decoy being coupled to said distal end of an associated one of said support arms wherein raising and lowering of said distal end of each said support arm imparts elevation and descent motion to each said decoy;
   a motor operationally coupled to said base and said drum for rotating said drum relative to said base;
   a piston coupled to said drum, said piston being extendable from said drum;
   an actuator operationally coupled to said piston wherein said actuator extends and retracts said piston relative to said drum;
   a plurality of connection arms, each of said connection arms having a respective upper end coupled to said piston and a respective lower end coupled to said associated one of said support arms wherein extension of said piston elevates each said distal end of each said support arm;
   a ring coupled to said base such that said hub extends around said ring, said ring being configured for electrically coupling to a power source; and
   a brush coupled to said hub, said brush being electrically coupled to said piston, said brush abutting said ring as said drum rotates relative to said base wherein said piston maintains electrical coupling to said ring as said drum rotates relative to said base.

2. The device of claim 1, further comprising said plurality of support arms being exactly four support arms.

3. A waterfowl decoy device comprising:
   a hub, said hub comprising a base and a drum rotationally coupled to said base;
   a motor operationally coupled to said base and said drum for rotating said drum relative to said base;
   a plurality of support arms coupled to said hub, each said support arm having a respective first end pivotally coupled to said hub, each said support arm extending radially from said hub wherein each said support arm has a distal end relative to said hub, each said support arm being movable relative to said hub such that said distal end of each said support arm relative to said hub is selectively raised and lowered relative to a position of said hub, said plurality of support arms being exactly four support arms, said support arms being evenly arranged and extending radially outward from said drum;
   a plurality of decoys, each said decoy being coupled to said distal end of an associated one of said support arms wherein raising and lowering of said distal end of each said support arm imparts elevation and descent motion to each said decoy;
   a piston coupled to said drum, said piston being extendable from said drum;
   an actuator operationally coupled to said piston wherein said actuator extends and retracts said piston relative to said drum;
   a plurality of connection arms, each of said connection arms having a respective upper end coupled to said piston and a respective lower end coupled to said associated one of said support arms wherein extension of said piston elevates each said distal end of each said support arm, said lower end of each said connection arm being pivotally coupled to said associated one of said support arms at a point of said support arm between said first end and said distal end of said support arm;
   a ring coupled to said base such that said hub extends around said ring, said ring being configured for electrically coupling to a power source;
   a brush coupled to said hub, said brush being electrically coupled to said piston, said brush abutting said ring as said drum rotates relative to said base wherein said piston maintains electrical coupling to said ring as said drum rotates relative to said base; and
   a respective opening extending into said distal end of each said support arm, each said decoy comprising a post extending from a main body section wherein each said decoy is couplable to said associated one of said support arms being insertion of said post into said distal end of said associated one of said support arms;
   a processor coupled to said hub, said processor being operationally coupled to said actuator wherein said processor controls raising and lowering of said distal end of each said support arm, said processor being operationally coupled to said motor wherein said processor controls activation of said motor to rotate said drum relative to said base;
   a receiver coupled to said hub, said receiver being operationally coupled to said processor;

a remote control; and a transmitter coupled to said remote control such that operational signals from said remote control are transmittable to said receiver wherein each said support arm is movable by operation of said remote control and said drum is rotated relative to said base by operation of said remote control.

* * * * *